United States Patent
Gaegauf et al.

(10) Patent No.: US 7,286,934 B2
(45) Date of Patent: Oct. 23, 2007

(54) INDIVIDUAL TRANSPORT CONTROL AND COMMUNICATION SYSTEM

(75) Inventors: Benedikt J. Gaegauf, Grand Rapids, MI (US); P. Charles Ammond, Grand Rapids, MI (US)

(73) Assignee: Cascade Engineering, Inc., Grand Rapids, MI (US)

( * ) Notice: Subject to any disclaimer, the term of this patent is extended or adjusted under 35 U.S.C. 154(b) by 307 days.

(21) Appl. No.: 10/493,646

(22) PCT Filed: Mar. 20, 2002

(86) PCT No.: PCT/US02/08535

§ 371 (c)(1),
(2), (4) Date: Sep. 23, 2004

(87) PCT Pub. No.: WO03/035427

PCT Pub. Date: May 1, 2003

(65) Prior Publication Data

US 2005/0090981 A1    Apr. 28, 2005

(51) Int. Cl.
*G06G 7/78* (2006.01)
*B60K 31/00* (2006.01)

(52) U.S. Cl. .......... 701/301; 701/96; 340/435; 180/168; 180/170

(58) Field of Classification Search .......... 701/1, 701/23–24, 300–302, 96; 340/901–904, 340/425.5, 435–436, 426; 342/29, 41; 307/9.1, 307/10.1; 180/167, 170
See application file for complete search history.

(56) References Cited

U.S. PATENT DOCUMENTS

| | | | |
|---|---|---|---|
| 3,744,855 A | | 7/1973 | Ochiai |
| 4,491,920 A | | 1/1985 | Wood et al. |
| 5,369,591 A | * | 11/1994 | Broxmeyer .................. 701/301 |
| 5,777,451 A | * | 7/1998 | Kobayashi et al. ......... 318/587 |
| 5,781,119 A | | 7/1998 | Yamashita et al. |
| 5,899,289 A | | 5/1999 | Uematsu |
| 6,032,097 A | * | 2/2000 | Iihoshi et al. .................. 701/96 |
| 6,282,468 B1 | * | 8/2001 | Tamura ........................ 701/23 |
| 6,292,109 B1 | * | 9/2001 | Murano et al. ............. 340/903 |
| 6,356,820 B1 | * | 3/2002 | Hashimoto et al. ........... 701/23 |
| 6,542,807 B2 | * | 4/2003 | Bienias et al. ................ 701/96 |

* cited by examiner

*Primary Examiner*—Yonel Beaulieu
(74) *Attorney, Agent, or Firm*—Price, Heneveld, Cooper, DeWitt & Litton, LLP

(57) ABSTRACT

An automated transportation (10) system includes a plurality of vehicles (22) adapted to travel along a pathway, and a monitoring system (70) located within each vehicle and adapted to monitor a location and a speed between an associated vehicle and the pathway. The automated transportation system (10) also includes a transmitter (72) located within each vehicle (22) and adapted to transmit a signal that includes data on the location and the speed monitored, and a receiver (76) located within each vehicle and adapted to receive the signal from each of the other vehicles. The automated transportation system (10) further includes a controller (78) located within each vehicle and adapted to interpret the signal received by the receiver and control the associated vehicle to provide proper spacing between the remaining vehicles to avoid collisions therebetween and maximize throughput of the vehicles along the pathway.

52 Claims, 11 Drawing Sheets

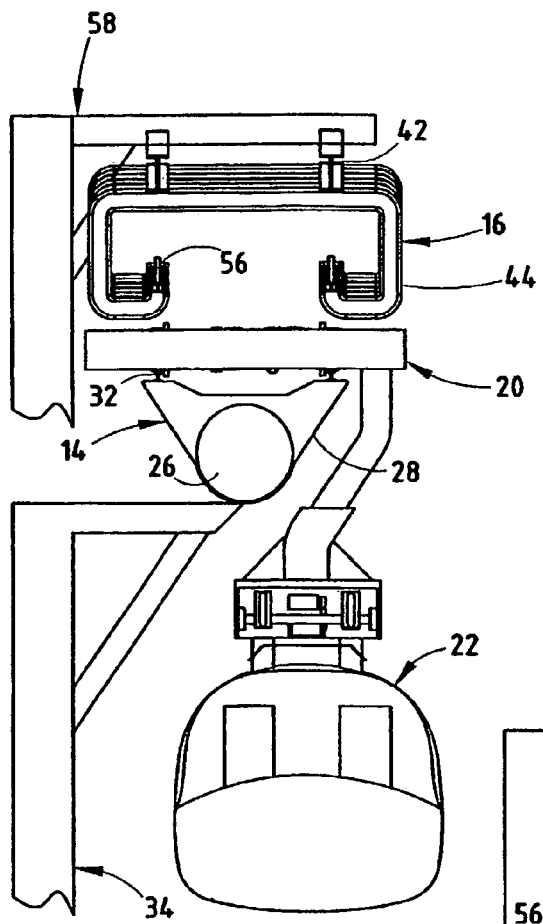
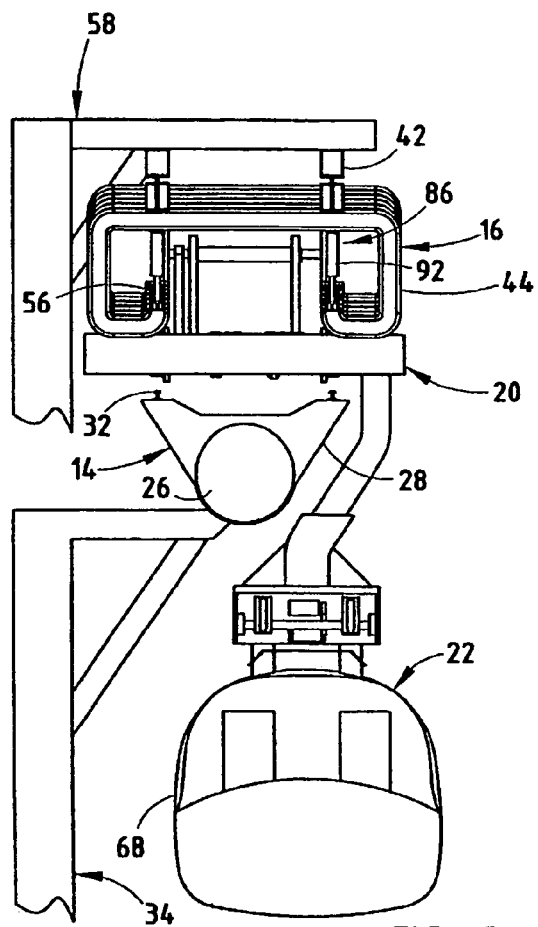
FIG. 3A
FIG. 3B

INDIVIDUAL TRANSPORT CONTROL AND COMMUNICATION SYSTEM

BACKGROUND OF THE INVENTION

The present invention relates to a vehicle control and communication system, and in particular to a vehicle control and communication system that controls the speed of a vehicle along a pathway relative to the position and speed of other vehicles traveling along the pathway.

Ever increasing demands on conventional individual transportation modes has led to unacceptable congestion. Expanding populations, most noticeably in urban areas, have begun to over tax our city streets and highway systems designed to support a fraction of the vehicular traffic currently using them. Such congestions have led to unacceptable delays resulting both in waste of time and excessive fuel consumption. The congestion problems are exacerbated by poor traffic management within particular concentrated areas, as well as within entire highway/roadway systems. In addition, individual traffic as currently organized, depends on each person to drive his or her vehicle safely and responsibly. Unfortunately, differences in driving skills and levels of responsibility can cause serious injuries or even fatalities.

An alternative to highway based transportation systems have been mass transit systems, including trains and subway systems. The most significant drawback with respect to these mass transits systems is the inconveniences associated with their schedules to pre-determined destinations. Profitable mass transit systems require a significant number of people in need of transportation at a particular location, at a particular time, traveling to the same destination. Other destinations can be reached, but only with one or more transfers by the passenger from one route onto another. With heavy usage and the commonly-applied principal of first-come-first-served, people might not have an available seat, or personal space to work in or relax. Mass transit systems are also required to operate at off-peak hours with minimal usage making them expensive to operate.

A new alternative under development is the individual transportation system. Typically, these systems include a plurality of individual "personal" vehicles traveling along a common pathway or railway system, and combine the advantages of a highway based transportation system, such as an automobile, and the advantages of a mass transit system. While an individual transportation system may relieve traffic congestions, decrease pollution and excessive fuel consumption, it must also provide safety to the passengers as well as maximize throughput along an associated pathway system. Specifically, the system should maximize throughput within the pathway system by effectively managing the relationship between vehicles, but also the overall movement of the vehicles within the overall system.

SUMMARY OF THE INVENTION

One aspect of the present invention is to provide a method for controlling a plurality of vehicles along a pathway that includes monitoring a location and a speed of each of a plurality of vehicles with respect to a pathway via an on-board monitoring system within each vehicle, transmitting, a signal that includes the location and the speed of each vehicle directly to each of the other vehicles via an on-board transmitter within each vehicle, and receiving the signal directly from the other vehicles via an on-board receiver within each vehicle. The method also includes controlling each of the vehicles via an on-board controller within each vehicle based on the signal received from each of the other vehicles to provide proper spacing between the vehicles, to avoid collisions therebetween and maximize throughput of the vehicles along the pathway.

Another aspect of the present invention is to provide an automated transportation system that includes a plurality of vehicles adapted to travel along a pathway, and a monitoring system located within each vehicle and adapted to monitor a location and a speed between an associated vehicle and the pathway. The automated transportation system also includes a transmitter located within each vehicle and adapted to transmit a signal that includes data on the location and the speed monitored, and a receiver located within each vehicle and adapted to receive the signal from each vehicle. The automated transportation system further includes a controller located within each vehicle and adapted to interpret the signal received by the receiver from each of the other vehicles and control the associated vehicle to provide proper spacing between the remaining vehicles to avoid collisions therebetween and maximize throughput of the vehicles along the pathway.

Yet another aspect of the present invention is to provide a method for controlling a vehicle along a pathway that includes monitoring a speed and a location of each of a plurality of vehicles with respect to a pathway via a monitoring system located within each vehicle, and transmitting a primary signal that includes the speed and location of each vehicle directly from each vehicle to each of the other vehicles via a transmitter located within each vehicle. The method also includes receiving the primary signal directly from the other vehicles via a receiver located within each vehicle, receiving the primary signal at a central controller, and receiving a secondary signal from the central controller via the receiver located within each vehicle. The method further includes controlling each of the vehicles via a vehicle control system located within each vehicle based on the primary signal received from each of the other vehicles to provide proper spacing between the vehicles to avoid collisions therebetween and maximize throughput of the vehicles along the pathway, and controlling each of the vehicles via the vehicle control system located within each vehicle based on the secondary signal received from the central controller if the primary signal is interfered with to provide proper spacing between the vehicles to avoid collisions therebetween and maximize throughput of the vehicles along the pathway.

Still yet another aspect of the present invention is to provide an automated transportation system that includes a plurality of vehicles adapted to travel along a pathway, a monitoring system located within each vehicle and adapted to monitor the speed and location with respect to the pathway, and a transmitter located within each vehicle and adapted to transmit a primary signal that includes data on the speed and the location monitor. The automated transportation system also includes a central controller adapted to receive the primary signal from each vehicle, and adapted to interpret the primary signal received and transmit a secondary signal, and a receiver located within each vehicle and adapted to receive the primary and secondary signals from each vehicle and the central controller, respectively. The automated transportation system further includes a vehicle control system located within each vehicle and adapted to interpret the primary signal received by the receiver from each of the other vehicles and control the associated vehicle to provide proper spacing between the remaining vehicles to avoid collisions therebetween and maximize throughput of the vehicles along the pathway, and further adapted to interpret the secondary signal received by the receiver from the central controller if the primary signal is interfered with to provide proper spacing between the remaining vehicles to avoid collisions therebetween and maximize throughput of the vehicles along the pathway.

Another aspect of the present invention is to provide an automated transportation system that includes a track system that includes at least two track members, and a plurality of vehicles that may be alternatively supported by the two track members, wherein each vehicle includes a switching system adapted to switch the vehicle between the track members. The automated transportation system also includes a monitoring system located within each vehicle and adapted to monitor a switching state of an associated vehicle, a transmitter located within each vehicle and adapted to transmit a primary signal that includes data on the switching state of the associated vehicle, and a receiver adapted to receive the primary signal from the transmitter. The automated transportation system further includes a vehicle control system located within each vehicle and adapted to interpret the primary signal received by the receiver and control the associated vehicle to provide proper spacing between the remaining vehicles to avoid collisions therebetween and maximize throughput of the vehicles along the pathway.

Still yet another aspect of the present invention is to provide a method for controlling a plurality of vehicles along a track system including providing a track system that includes at least two track members, and providing a plurality of vehicles that may be alternatively supported from the track members, wherein each vehicle includes a switching system adapted to switch the vehicle between tracks. The method also includes monitoring a switching state of each of the plurality of vehicles with respect to the track members via a monitoring system located within each vehicle, transmitting a primary signal that includes a switching state of the vehicle to at least one controller, and receiving the primary signal at the controller. The method further includes controlling each of the vehicles via a vehicle control system located within each vehicle based on the primary signal received by the controller to provide proper spacing between the vehicles to avoid collisions therebetween and maximize throughput of the vehicles along the track as the vehicles switch between track members.

In another aspect of the present invention, a wheel slippage monitoring system includes a first monitoring device adapted to measure the rotational velocity of a wheel of a vehicle, and a second monitoring device adapted to measure the linear velocity of the vehicle along the pathway. The wheel slippage monitoring system also includes a comparator for comparing the rotational velocity of the wheel with the linear velocity of the vehicle and determining the amount of slippage of the wheel with respect to the pathway.

Still yet another aspect of the present invention is to provide a wheel wear monitoring system that includes a first monitoring device adapted to measure a current rotational velocity of a wheel of a vehicle, wherein the wheel has an outer diameter, and a second monitoring device adapted to measure a current linear velocity of the vehicle along a pathway. The wheel wear monitoring system further includes a comparator for comparing the current rotational velocity and linear velocity to a set value for the rotational velocity of the wheel calculated from a prime wheel diameter corresponding to the current linear velocity, thereby determining the reduction and the diameter of the wheel from the prime wheel diameter.

The present inventive vehicle control and communication system and methods associated with its use provide a highly effective means for providing proper spacing between a plurality of vehicles, thereby avoiding collisions therebetween, and maximizing throughput of the vehicles along an associated pathway by effectively managing the vehicles within an overall transportation system, and is particularly well adapted for the proposed use.

These and other advantages of the invention will be further understood and appreciated by those skilled in the art by reference to the following written specification, claims, and appended drawings.

BRIEF DESCRIPTION OF THE DRAWINGS

FIG. 3A is a rear elevational view of the main track section, the switch track section, the carriage and vehicle supported by the main track section;

FIG. 3B is a rear elevational view of the main track section, the switch track section, and the carriage and vehicle supported by the switch track section;

DETAILED DESCRIPTION OF THE PREFERRED EMBODIMENT

Figure 2A:
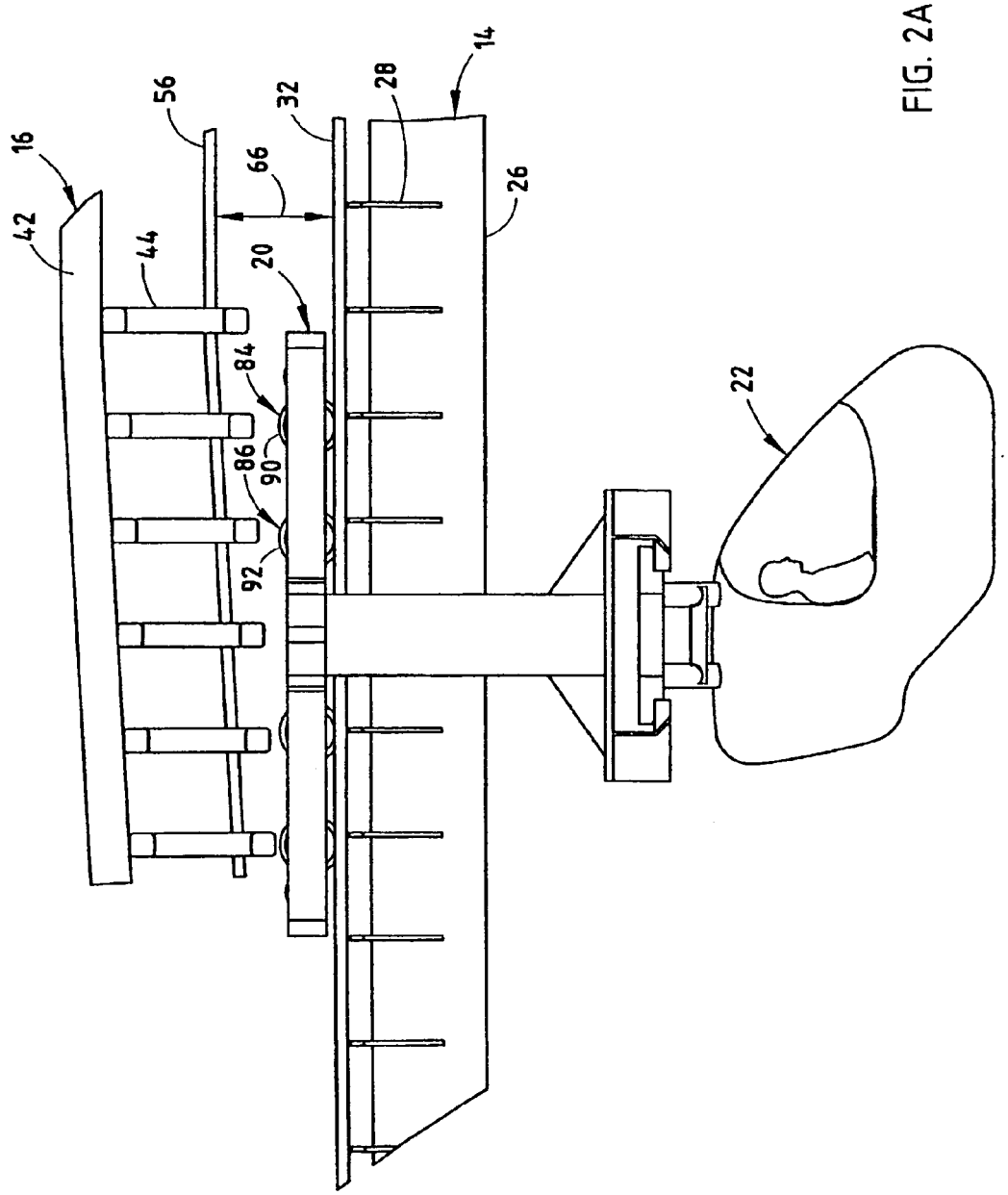
FIG. 2A is a side elevational view of a main track section, a switch track section, and a carriage and a vehicle supported by the main track section.

For purposes of description herein, the terms "upper," "lower," "right," "left," "rear," "front," "vertical," "horizontal," and derivatives thereof shall relate to the invention as oriented in FIG. 2A. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
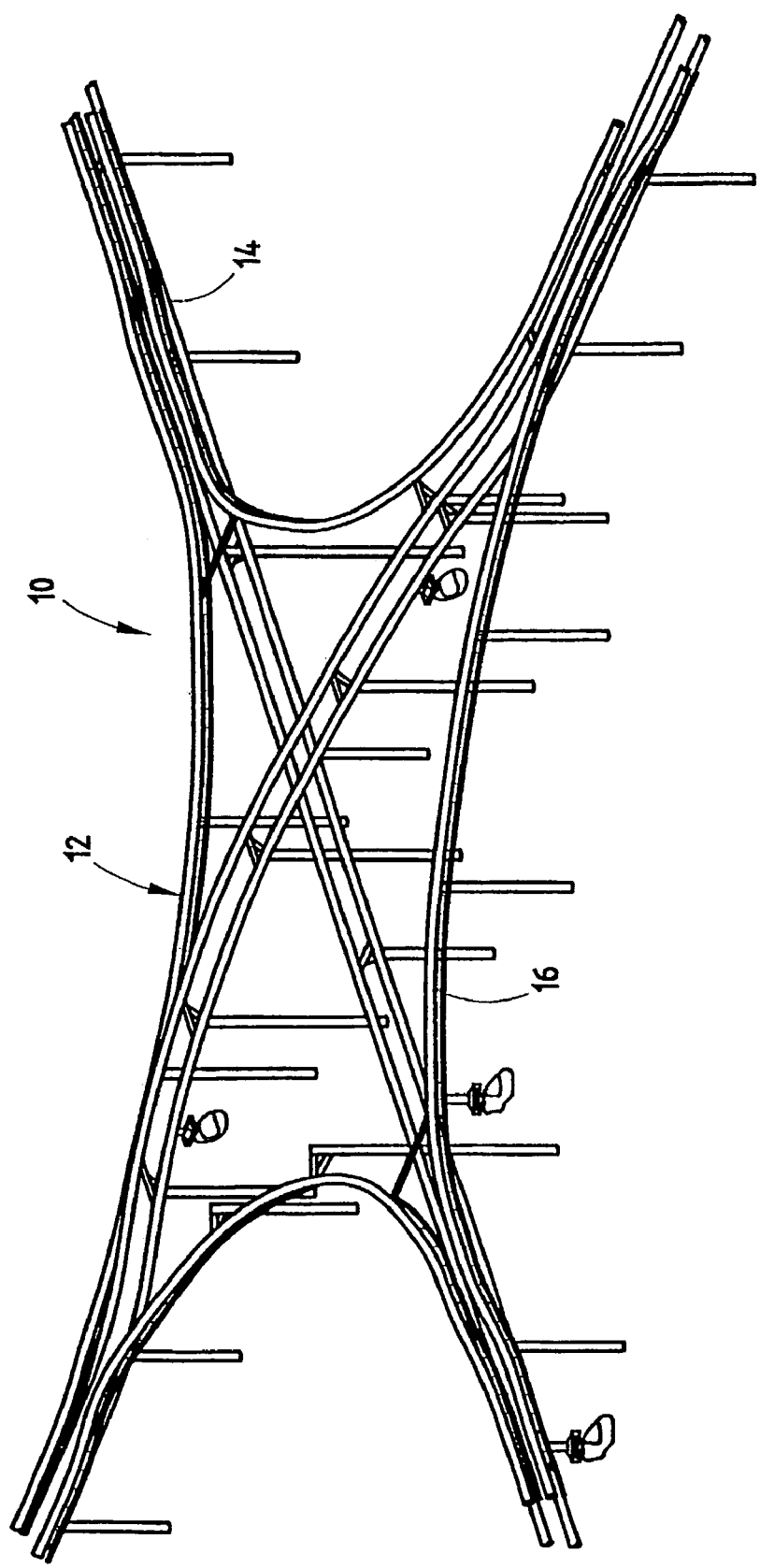
FIG. 1 is a perspective view of the individual transportation system, or transit system, as controlled by the control and communication system.

In the illustrated example, the present inventive individual transport control and communication system is utilized in conjunction with an individual transportation system 10 (FIG. 1). It should be noted that while the illustrated control and communication system of the automated transportation system 10 includes a plurality of vehicles supported by an overhead track, these principals and concepts disclosed herein may be applied to other transportation system that include vehicles traveling along a common track and/or to a plurality of motorized vehicles traveling along a highway system, and that the description of transportation system 10 is provided for illustrative and contextual purposes only.

Transportation system 10 includes a track system 12 having a primary track section 14 and a switch track section 16. The transportation system 10 also include a plurality of carriages 20 (FIG. 2A) supported by track system 12, a plurality of passenger vehicles 22 each mateably engageable with one of the carriages 20 and adapted to hold at least one passenger and/or cargo therein. The track system 12 includes a primary track section 14 that extends between points of interest such as urban areas, cities, plants, and/or facilities on a business campus or the like. Switching track section 16 of track system 12 allows switching of the carriage 20 and passenger vehicle 22 combination to be redirected and transferred between different primary track sections 14.

In the illustrated example, track system 12 is a passive track in that no power is supplied to the carriage 20 and passenger vehicle 22 combination while carriage 20 moves along track system 12, thereby eliminating the possibility of a power supply interruption to the carriage and passenger vehicle 22 combination operating thereon and the possible halting of numerous carriage 20 and passenger vehicle 22 combinations traveling along system 12. However, it should be noted that track system 12 may in fact include a power supply associated therewith. In addition, in the illustrated example, track system 12 is a static track in that the track itself is stationary and all switching operations are accomplished via manipulation of carriage system 20. However, it should be noted that in certain applications, track system 12 may include moveable members that assist and/or accomplish the switching procedure.

Primary track section 14 (FIGS. 2A and 3A) includes a longitudinally extending main support structure 26. Primary track section 14 also includes a plurality of laterally extending track support members 28 spaced longitudinally along main support structure 26. The geometrical cross-section of each main track member 32 is similar to that of railway rails. The main track members 32 extend in an end-to-end fashion and may be welded or spliced together, or connected by some other appropriate means. Primary track section 14 is supported above the ground via a plurality of primary track supporting poles 34.

Figure 2B:
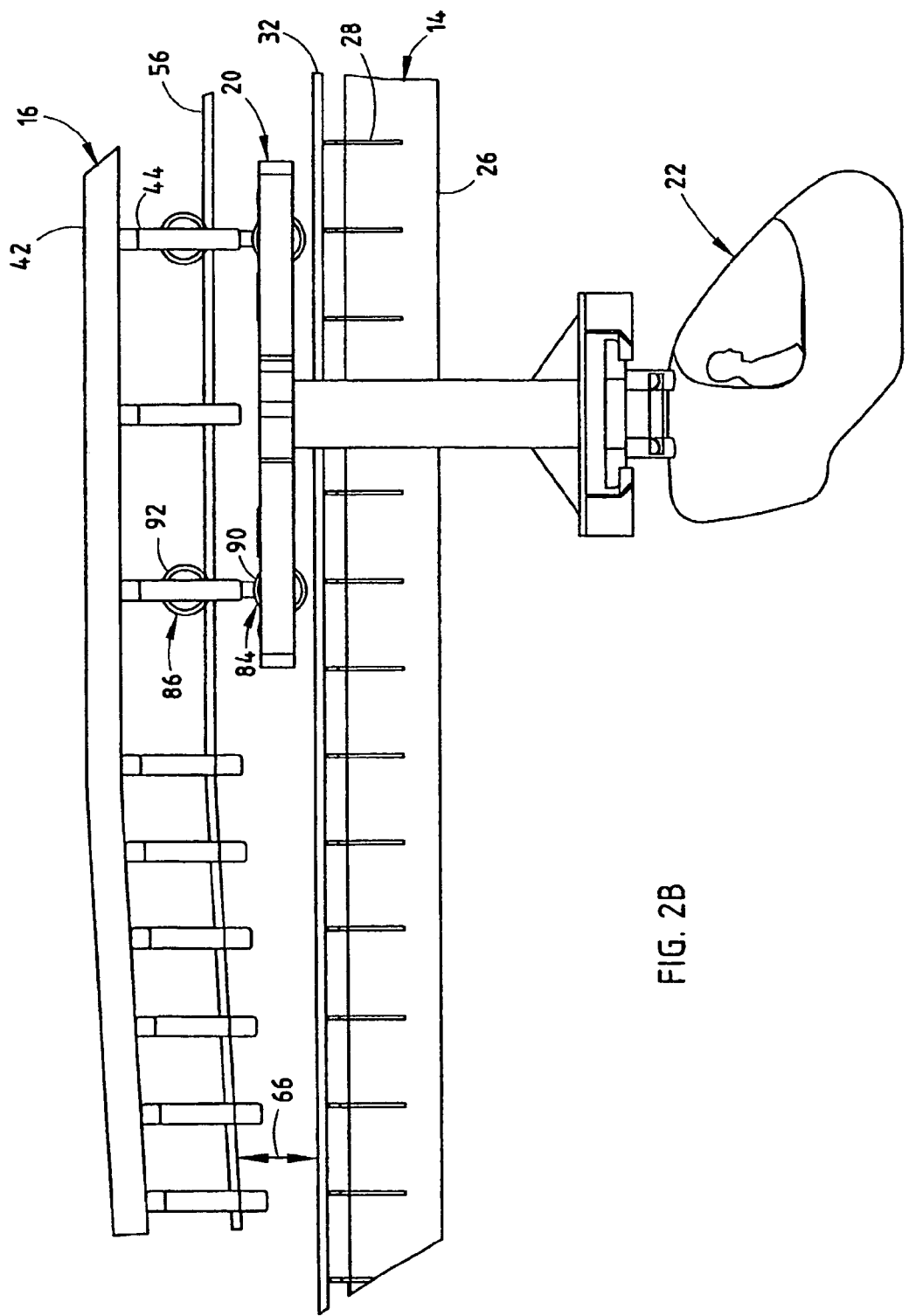
FIG. 2B is a side elevational view of the main track section, the switch track section, the carriage and vehicle supported by the switch track section.

The switching track section 16 (FIGS. 2B and 3B) includes a pair of longitudinally extending switching track support structures 42 to which a plurality of substantially C-shaped laterally extending switch track support members 44 are fixedly attached and spaced longitudinally therealong. Each switch track support member 44 supports a pair of switching track members 56 thereon. Each switching track member 56 is provided with a geometrical cross-sectional shape similar to that of main track members 32 as described above. The switching track section 16 is supported above ground level by a plurality of switching track support poles or structures 58.

The track system 12 is constructed such that at least a portion of switching track members 56 are vertically aligned with main track members 32. This alignment allows for ease in switching the carriage 20 and passenger vehicle 22 combination from being supported by primary track section 14 and switching track section 16. In addition, as best illustrated in FIGS. 3A and 3B, the switching track section 16 is oriented with respect to the primary track section 14, such that the vertical distance between main track member 32 and a corresponding switching track member 56, as indicated by arrow 66, changes along the longitudinal length of track system 12. The change of vertical distance 66 is utilized when switching the carriage 20 and passenger vehicle 22 combination from being supported on primary track section 14 to being supported on switching track section 16, and vice versa.

Figure 4:
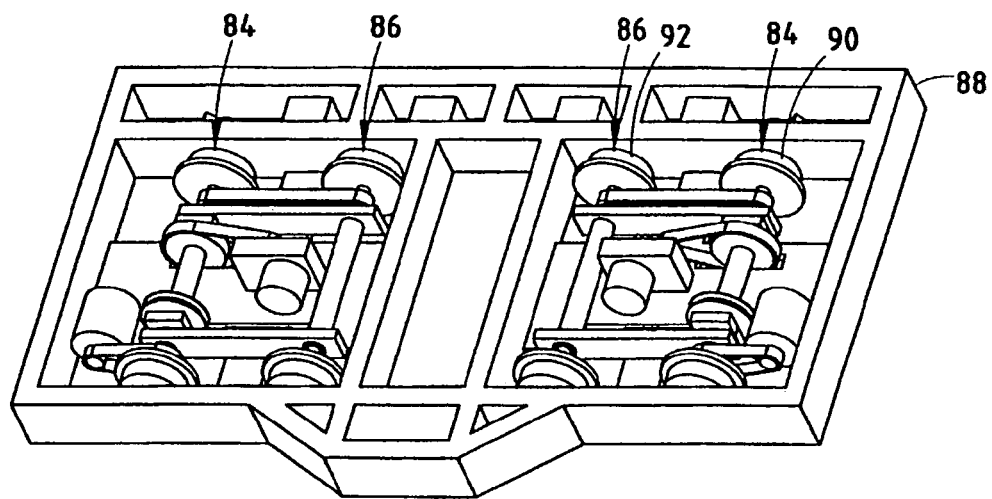
FIG. 4 is a perspective view of a housing and drive units of the carriage.

Carriage system 20 detachably supports the associated passenger vehicle 22 therebelow. Carriage system 20 includes a housing 88 (FIG. 4) assembly that houses a primary drive system 84 and a secondary drive system 86. Primary drive system 84 is adapted to propel the carriage system 20 and passenger vehicle 22 combination along main track members 32 of primary track section 14, while secondary drive system 86 is adapted to drive the carriage system 20 and passenger vehicle 22 combination along switching track members 56 of switching track section 16. In the illustrated example, the secondary drive system 86 may be rotated between a storage position (FIGS. 2A and 3A), wherein the carriage 20 and vehicle 22 combination is supported by primary track section 14, and in-use position (FIGS. 2B and 3B), wherein the carriage 20 and vehicle 22 combination is supported by switching truck section 16 when aligned therewith.

Figure 5A:
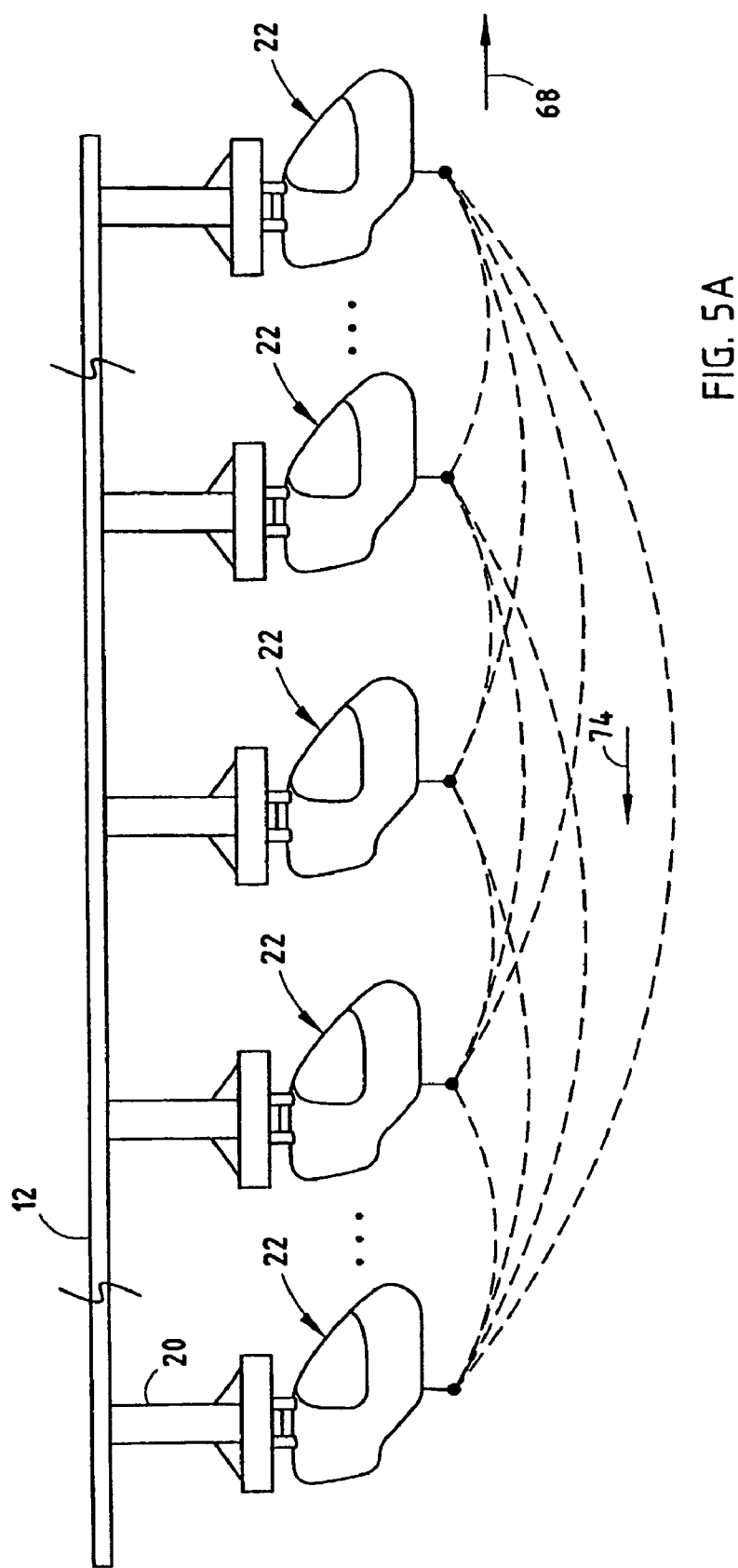
FIG. 5A is a schematic view of the control and communication system of the present invention.

In the schematically illustrated example shown in FIG. 5A, automated transportation system 10 includes a plurality of the carriage 20 and passenger vehicle 22 combinations traveling along track system 12 in a direction indicated by arrow 68. A monitoring system 70 (FIG. 5B) is located within each vehicle 22 and is adapted to monitor a location and an absolute speed between the associated vehicle 22 and track system 12. A transmitter 72 is also located within each vehicle 22 and is adapted to transmit a signal in a direction indicated by arrow 74 that includes data on the location and the speed monitored by the monitoring system. A receiver 76 located within each vehicle 22 is adapted to receive signal 74 as transmitted by each of the transmitters 72 associated with each vehicle 22. A controller 78 is located within each vehicle 22 and is adapted to interpret signal 74 as received by receiver 76 and to control the associated vehicle 22 based on the interpretations of signal 74 to provide proper spacing between the associated vehicle 22 and the remaining vehicles to avoid collisions therebetween and maximize throughput of vehicles 22 along track system 12. Although in the illustrated example monitoring system 70, transmitter 72, receiver 76 and controller 78 are each shown as being located within vehicle 22, it should be noted that each of these components may be located within vehicle 22, carriage 20, or a combination thereof, and that the components are shown within vehicle 22 for illustrative purposes only.

The monitoring system 70 located within each vehicle 22 is adapted to monitor a plurality of variables, including the relative linear speed between the associated vehicle 22 and track system 12, the acceleration/deceleration of each vehicle 22 relative to track system 12, the application of brakes within the associated vehicle 22, the absolute position of the associated vehicle 22 within track system 12, the distance between the associated vehicle 22 and a preceding vehicle, the switching status of carriage 20 supporting the associated vehicle 22, the optimum speed for vehicle 22 given particular track conditions, weather conditions, etc., routing information for the associated vehicle 22, pending merge points, the "health status" of an associated vehicle 22, and a particular identification for each vehicle 22.

The linear speed of the associated vehicle 22 with respect to track system 12 may be monitored in a variety of ways including, but in no way limited to, a speedometer system, a global positioning system (GPS), a bar code reader system wherein the reader scans symbols affixed to track system 12, a radar system, a radio frequency identification system, and the like. The acceleration/deceleration of vehicle 22 relative to track system 12 may be monitored via similar means as the linear speed thereof. The application of brakes within vehicle 22 may be monitored via a proximity switch, pressure sensor, or by any other means capable of monitoring the application of brakes prior to the actual slowing of vehicle 22. The absolute position of the associated vehicle 22 within track system 12 can be monitored by many of the same means as utilized to monitor the linear speed of vehicle 22, including a GPS system, a bar code reading system and the like. The distance between vehicles 22 may also be monitored in a variety of ways, including utilizing a GPS system, utilizing a bar code reading system, a forwardly facing radar system 80, and the like.

The transmitter 72 and receiver 76 located within each vehicle 22 transmit and receive signal 74, respectively. Signal 74 includes data relating to the linear speed of the vehicle 22 relative to track system 12, the acceleration/deceleration of vehicle 22 relative to track system 12, the application of brakes within vehicle 22, the absolute position of vehicle 22 within track system 12, the distance between vehicles 22, and the like. In a preferred embodiment, signal 74 is received by vehicles 22 within a particular range, geographical location, or segment or of track system 12, however, signal 74 may be transmitted to each and every vehicle 22 located within track system 12 depending on physical limitations such as the type of transmission/receiver system utilized, the broadcast frequency, the distance between vehicles 22, etc.

The controller 78 associated with each vehicle 22 is in operable communication with monitoring system 70, transmitter 72 and receiver 76. The controller 78 is adapted to interpret signal 74 received by receiver 76 and to control the associated vehicle 22 based on the interpretation of signal 74 as well as the data received from monitoring system 70 associated therewith. In the present example, controller 78 provides proper spacing between the associated vehicle 22 and the remaining vehicles within track system 12 to avoid collisions therebetween and maximize throughput of vehicles 22 within track system 12 by providing collision avoidance, reducing delay times associated with stack error as discussed below and the like.

Figure 6:
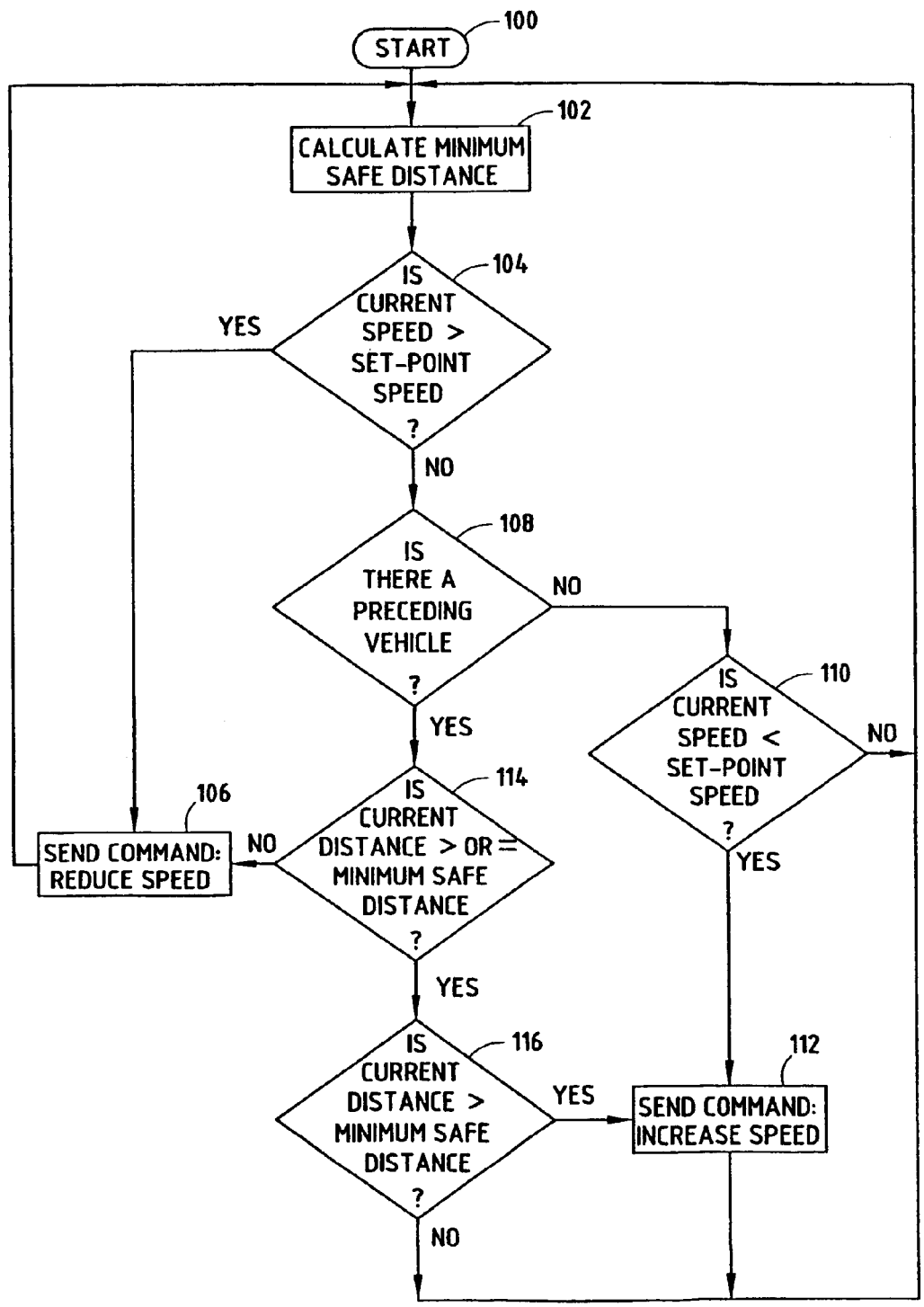
FIG. 6 is a flow chart of a routine for monitoring and controlling a following distance for as conducted by a controller within each vehicle.

The specific decision making routine conducted by controller 78 is illustrated in FIG. 6. In the illustrated routine, vehicle 22 enters the track system 12 or "starts" in motion along track 12 in step 100. The controller 78 calculates an initial minimum safe distance between vehicles based on particular inputs such as track conditions based on weather, brake operational efficiency, etc., and sets a set-point speed in step 102. Controller 78 continually monitors the linear speed of associated vehicle 22 against the set-point speed and adjusts accordingly in step 104 to keep associated vehicle 22 traveling at the set-point speed. Specifically, if the current linear speed of associated vehicle 22 is less than or equal to the set-point speed, controller 78 allows vehicle 22 to continue to operate at the current linear speed. However, if the current linear speed of vehicle 22 is greater than the set-point speed, controller 78 slows the associated vehicle in step 106. Controller 78 also continuously monitors signals 74 received from preceding vehicles and determines if there is a preceding vehicle in step 108. If the associated vehicle 22 is not preceded by another vehicle, controller 78 continues to monitor the current linear speed of associated vehicle 22 against the set-point speed in step 110, similar to as discussed above. Further, if there is no preceding vehicle, controller 78 determines whether the actual speed of vehicle 22 is less than the set-point speed in step 110, and may increase the linear speed of vehicle 22 along track 12 in step 112. If controller 78 determines that associated vehicle 22 is preceded by another vehicle in step 108, controller 78 determines whether the distance between the associated vehicle 22 and the preceding vehicle is greater than or equal to the minimum safe following distance in step 114. Specifically, if the minimum safe following distance is not met, the controller reduces the speed of the associated vehicle 22 via step 106. If controller 78 determines that the distance between the associated vehicle 22 and the preceding vehicle is greater than and/or equal to the minimum safe following distance, controller 78 then determines whether the actual following distance is specifically greater than or equal to the minimum safe following distance in step 116. Specifically, if the actual following distance is greater than the minimum safe following distance, controller 78 increases the speed of the associated vehicle 22 via step 112, while the actual following distance is equal to the minimum safe following distance, controller 78 does not adjust the speed of the associated vehicle 22. It should be noted that the value for the minimum safe following distance in step 116 may include a safety factor, thereby allowing a distance between the vehicles that is slightly greater than the minimum safe following distance.

By communicating the data as described above directly between each and every vehicle 22 operating within track system 12 or a subsection thereof, the stack error associated with cascading the information along a line of vehicles 22 is eliminated. Specifically, any trailing vehicle 22 within a group of vehicles is instantaneously and immediately notified of any change in operation of any preceding vehicle, such as an acceleration/deceleration, the application of brakes, the absolute position and speed of a preceding vehicle and the spacing between preceding vehicles as well as between any vehicle 22 and the vehicle immediately preceding that vehicle. This direct communication eliminates stack error(s), as well as delay time associated with a central control system which in turn would control the vehicles. In addition, the switching status of carriage 20 between track members 32 of primary track section 14 and track members 56 of switching track section 16 can be immediately transferred to any following vehicles 22. Further, a pending switching motion can also be communicated between the vehicles 22, such as when a carriage and passenger vehicle 22 combination approaches a predetermined switching point as known and communicated by the associated controllers 78 as described below.

Figure 7:
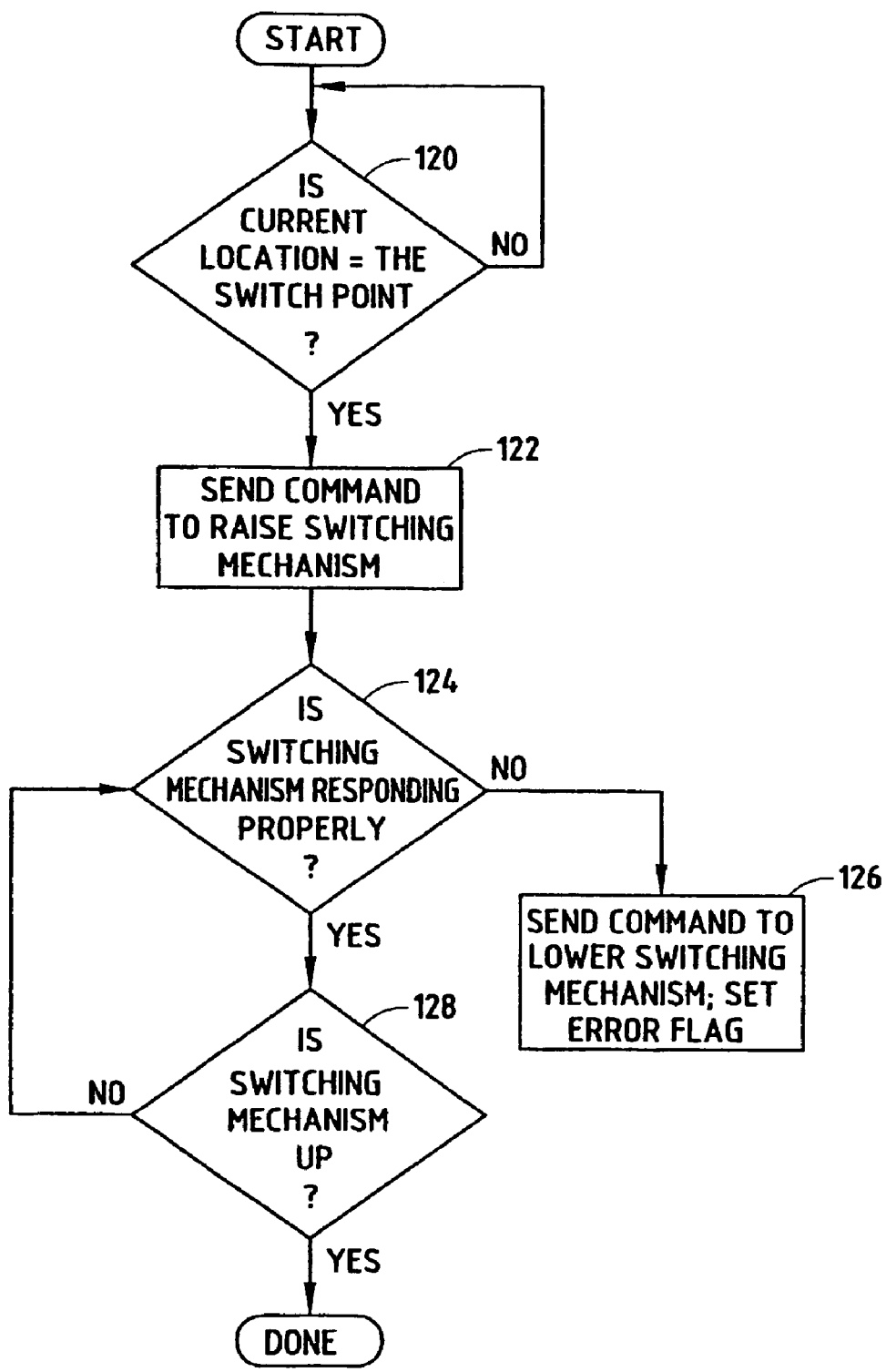
FIG. 7 is a flow chart for a routine for monitoring and controlling a switching function for each carriage as conducted by the controller within each vehicle.

The monitoring system 70 within each vehicle 22 also monitors the switch condition of carriage 20 associated therewith, and may be utilized to manipulate the switching state based on the location, speed, etc., of the carriage 20 and vehicle 22 combination within track system 12. The specific decision making routine conducted by controller 78 for controlling the switching state of carriage 20 is illustrated in FIG. 7. The monitoring system 70 of each vehicle 22 continuously monitors the location of the carriage 20 and vehicle 22 combination with primary track section 14. Controller 78 determines whether the location of the carriage 20 and vehicle 22 combination corresponds to a particular predetermined location along the primary track 14 preceding the beginning of switching track member 16 in step 120, and initiates rotation of the secondary drive system 86 from the storage position (FIGS. 2A and 3A) to the in-use position (FIGS. 2B and 3B) in step 122. Monitoring system 70 also monitors whether the secondary drive system 86 has been properly rotated from the storage position to the in-use position in step 124. Specifically, if the lifting procedure has not been conducted properly, an error signal can be sent to the passengers within vehicle 22, as well as central control station in step 126. In addition, an error signal is utilized to cause controller 78 to lower the secondary drive system 86 back to the storage position if it has only partially rotated to the in-use position. Monitoring system 70 continues to monitor the position of secondary drive system 86 while in use to assure proper operation thereof in step 126. The monitoring system 70 and controller 78 perform a reverse function of monitoring and lowering the secondary drive system 86 from the in-use position to the storage position similar to as described above.

The switching status of each carriage 20 and vehicle 22 combination is communicated with every other vehicle operating within track system 12 or a particular segment thereof as previously discussed similar to as described above with respect to absolute linear velocity of each vehicle, the distance between vehicles, etc. The communication of the switching data discussed above with other vehicles improves safety by providing for collision avoidance and increases the throughput of vehicles with the track system 12 by allowing the controllers 78 of vehicles 22 to adjust the relative positions and speeds of the associated vehicle 22 with respect to the data received.

Figure 8:
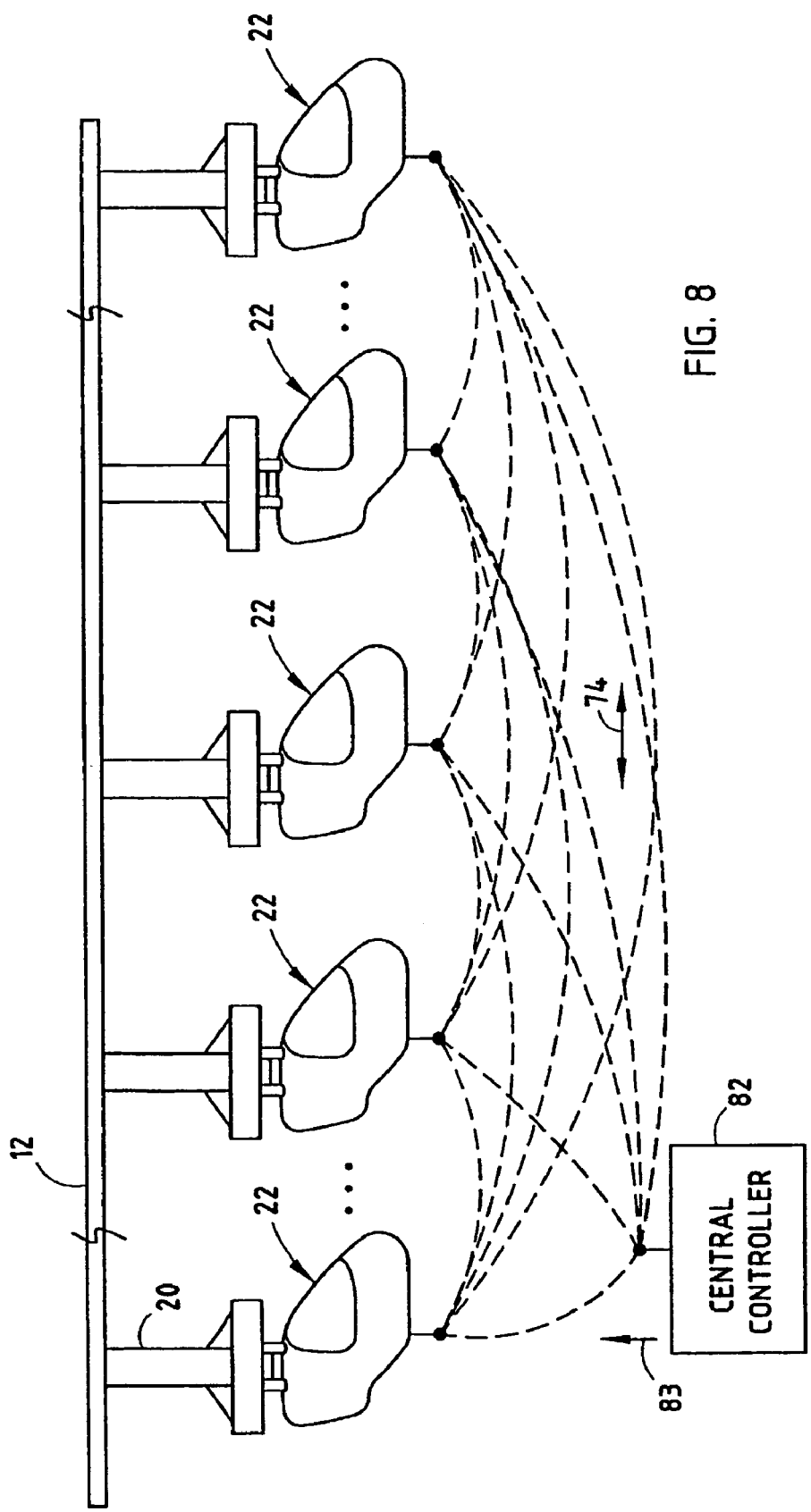
FIG. 8 is a schematic view of an alternative embodiment of the control and communication system of the present invention.

In an alternative embodiment, as shown in FIG. 8, the signal 74 as communicated between the transmitters 72 and receivers 76 of vehicles 22 is also received by a central controller 82. Central controller 82 can form a plurality of functions by providing a backup or secondary signal as indicated by arrow 83 to each vehicle 22. The secondary signal 83 provided by central controller 82 includes information similar to that compiled by controller 78 within each vehicle 22 including the speed of a particular vehicle 22 with respect to track system 12, the acceleration/deceleration of each vehicle 22 relative to track system 12, the application of brakes within each vehicle 22, the distance between vehicles 22, and the switching status of each carriage 20 and vehicle 22 combination. The signal 83 as transmitted by central controller 82 and received by receivers 76 within each vehicle 22 is utilized by the controllers 78 within each vehicle 22 to control the associated vehicle 22 and provide adequate spacing between the associated vehicle 22 and the remaining vehicles. Central controller 82 may be utilized as a backup control system to the controllers 78 within each vehicle 22 in the event signal 74 is disrupted and not received by the particular receiver 76 and/or in the event of a malfunction of an onboard controller 78 provided the physical mechanisms associated with the carriage 20 and vehicle 22 combination are still operable. Further, the signal that is received from central controller 82 may be used in conjunction with signal 74 from each vehicle 22 to organize and streamline the overall efficiency of the vehicle traffic within track system 12 as well as to verify signal 74.

The automated transportation system 10 further includes a wheel slippage monitoring system for monitoring the efficiency of primary drive system 84 and secondary drive system 86 within carriage system 20. In the illustrated example, primary drive system 84 (FIG. 4) includes two pairs of primary drive wheels 90 located at opposite ends of housing 88 and adapted to ride along main track members 32 of primary track section 14, as shown in FIGS. 2A and 3A. Each primary drive wheel 90 is preferably constructed of steel, a hard polyurethane material, or combination of both, although other suitable materials may be used. Secondary drive system 86 includes two pairs of secondary drive wheels 92 placed at opposite ends of housing 88 in which are adapted to propel the carriage system 20 and passenger vehicle 22 combination along switching track members 56 of switching track section 16. Each wheel 92 is preferably constructed of steel, a soft polyurethane, or combination of both, although other suitable materials may be used.

Weather conditions, track conditions, and possible mechanical failures may cause the primary drive wheels 90 and/or secondary drive wheels 92 to slip or spin relative to main track members 32 and switching track members 56, respectively. The resulting slippage of wheels 90 and 92 would not only decrease the efficiency of the travel of the carriage 20 and passenger vehicle 22 combinations within track system 12, but may also result in stack problems between vehicles 22 within particular segments of the track system as well as raise safety issues with respect to spacing between vehicles 22 and collisions therebetween.

Figure 5C:
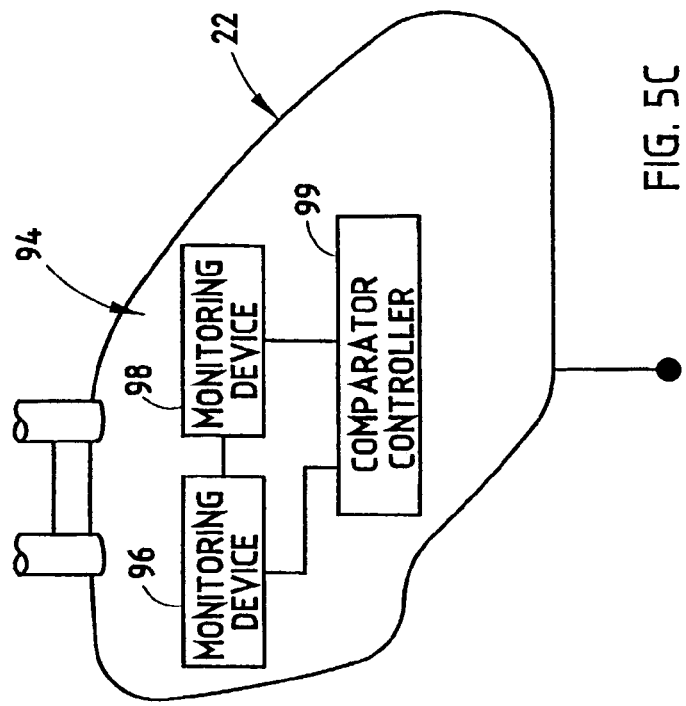
FIG. 5C is a schematic view of a wheel slippage monitoring system of each individual vehicle.
Figure 5B:
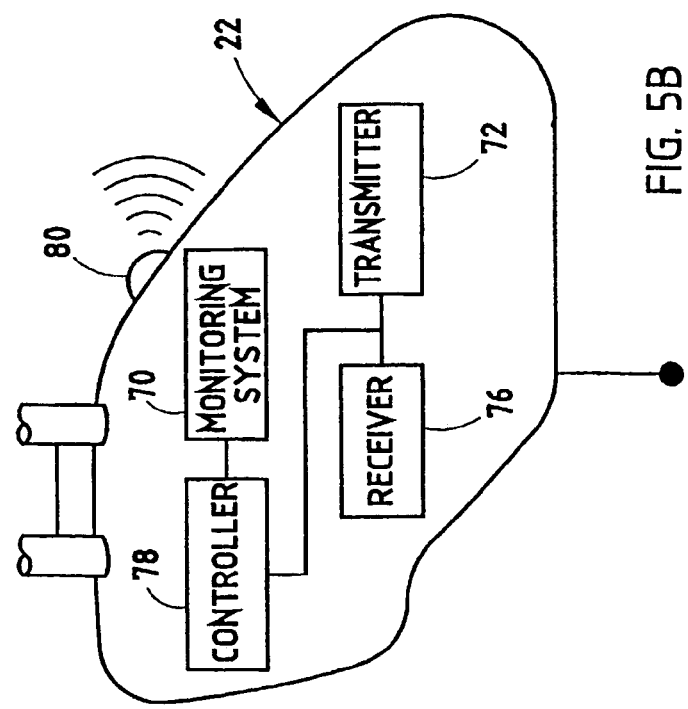
FIG. 5B is a schematic view of the control and communication equipment of each individual vehicle.

The wheel slippage monitoring system 94, schematically shown in FIG. 5C, includes a first monitoring device 96 adapted to measure the rotational velocity of primary drive wheels 90 of primary drive system 84 and/or secondary drive wheels 92 of secondary drive system 86 of a carriage 20 associated with a particular passenger vehicle 22. The first monitoring device may include a tachometer, laser based rotational monitoring system, or any other monitoring device capable of monitoring the rotational velocity of primary drive wheels 90 and/or secondary drive wheels 92. The wheel slippage monitoring system 94 also includes a second monitoring device 98 that measures the linear velocity of the associated vehicle 22 along track system 12 as discussed above. Wheel slippage monitoring system 94 also includes a comparator/controller 99 (which may be integrated with controller 78) for comparing the rotational velocity as monitored by first monitoring system 96 with the linear velocity as monitored by second monitoring device 98 and determines the amount of slippage of the associated wheel 90 and/or 92 with respect to track system 12. The comparator/controller 99 is adapted to compare the linear velocity of the associated vehicle 22 along track system 12 to a linear velocity based on the rotational velocity of the wheel 90 and/or 92 as monitored by the second monitoring device 98.

Figure 9:
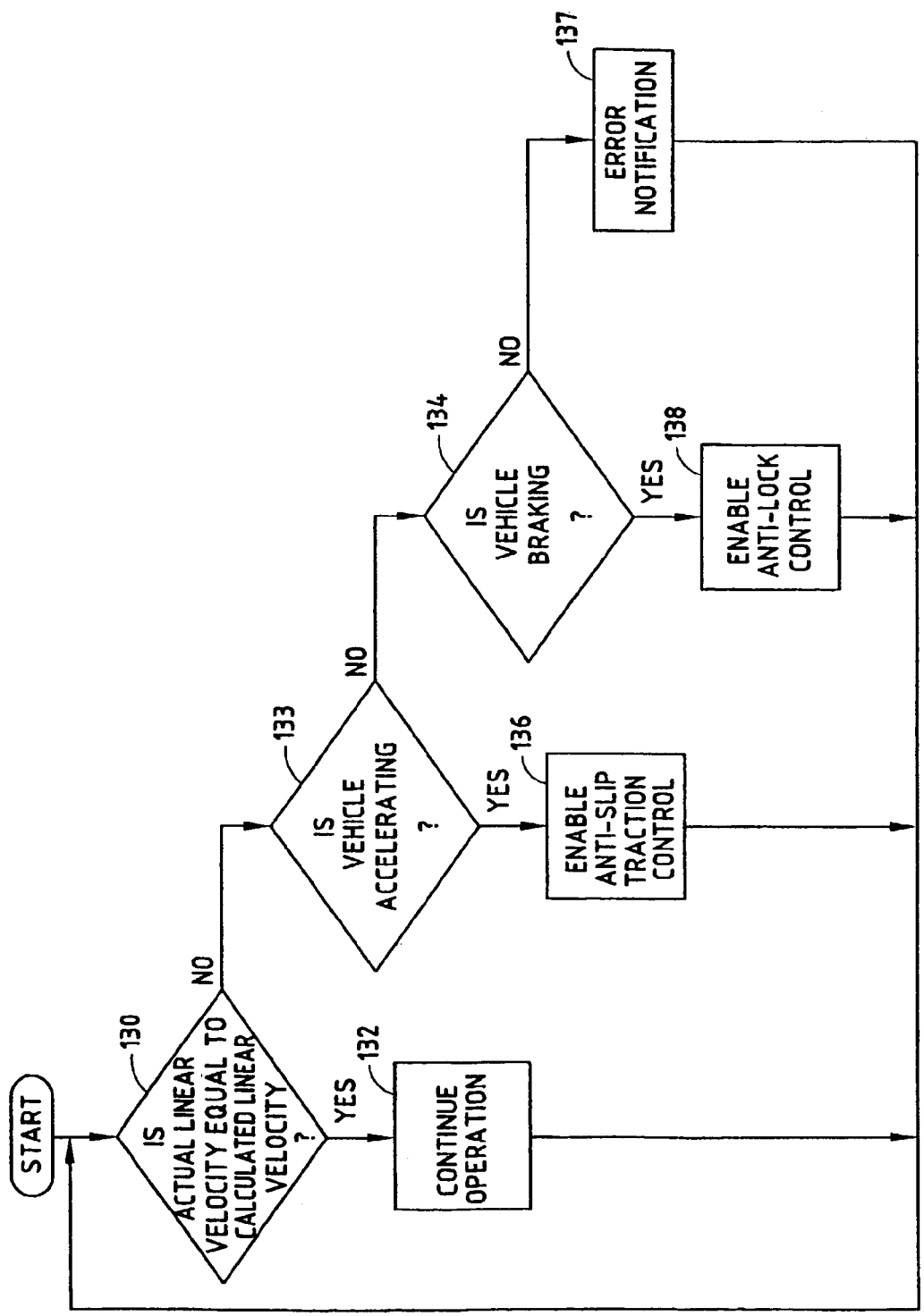
FIG. 9 is a flow chart of a routine for monitoring and controlling wheel slippage of the drive units as conducted by a controller within each vehicle.

The specific decision making routine conducted by the controller 99 is illustrated in FIG. 9. In the illustrated routine, the linear velocity of vehicle 22 as monitored by second monitoring device 98 is compared with the linear velocity that should result from a particular rotational velocity of wheel 90 and/or 92 as monitored by first monitoring device 96 in step 130. Specifically, if the actual measured linear velocity and the calculated linear velocity match within a reasonable amount of error, the speed is communicated with the passenger, central controller 82, etc., and the system continues to operate unaffected as shown in step 132. If the actual measured linear velocity and the calculated linear velocity do not match within a reasonable amount of error, controller 99 determines if vehicle 22 is attempting to accelerate in step 133 or decelerate in step 134. If vehicle 22 is attempting to accelerate, controller 99 enables an anti-slip traction control device in step 136. If vehicle 22 is attempting to decelerate, controller 99 enables an anti-lock control associated with the braking mechanisms, as shown in step 138. If vehicle 22 is neither accelerating or decelerating, controller 99 may send a warning signal to the operator and/or central controller 82 indicating excessive wheel slippage. The slippage of wheels 90 and/or 92 is in turn used to control the associated vehicle and is communicated with other vehicles to assist in the spacing therebetween and congestion within the overall track system 12 as discussed above.

In an alternative embodiment, the comparator/controller 99 compares the linear velocity as monitored by the first monitoring device 96 with a set value for the rotational velocity of the wheel 90 or 92 from a prime wheel diameter corresponding to the current linear velocity, thereby determining the reduction in the diameter of the wheel from the prime wheel diameter. In the illustrated example, the prime wheel diameter may be the original diameter of the wheel when first placed into service, and/or an optimum diameter for the wheel to maximize power, reduce slippage between the wheel 90 and/or 92 and track system 12, and the like.

The present inventive vehicle control and communication system and methods associated with its use provide a highly effective means for providing proper spacing between a plurality of vehicles, thereby avoiding collisions therebetween, and maximizing throughput of the vehicles along an associated pathway by effectively managing the vehicles within an overall transportation system, and is particularly well adapted for the proposed use.

It will become apparent to those skilled in the art that modifications may be made to the invention without departing from the concept disclosed herein. Such modifications are to be considered as included in the following claims, unless these claims by their language expressly state otherwise.

The invention claimed is:

1. A method for controlling a plurality of vehicles along a pathway, comprising:
    monitoring a location and a speed of each of a plurality of vehicles with respect to a pathway that includes a track system adapted to support the plurality of vehicles, wherein the monitoring is conducted via an on-board monitoring system within each vehicle;
    transmitting a signal that includes the location and the speed of each vehicle directly from each vehicle to each of the other vehicles via an on-board transmitter within each vehicle;
    receiving the signal directly from the other vehicles via an on-board receiver within each vehicle; and
    controlling each of the vehicles via an on-board controller within each vehicle based on the signal received from each of the other vehicles to provide proper spacing between the vehicles to avoid collisions therebetween and maximize throughput of the vehicles along the pathway.

2. An automated transportation system, comprising:
    a plurality of vehicles adapted to travel along a pathway, wherein the pathway includes a track system adapted to support the plurality of vehicles;
    a monitoring system located within each vehicle and adapted to monitor a location and a speed between an associated vehicle and the pathway;
    a transmitter located within each vehicle and adapted to transmit a signal that includes data on the location and the speed monitored;
    a receiver located within each vehicle and adapted to receive the signal from each vehicle;
    a controller located within each vehicle and adapted to interpret the signal received by the receiver and control the associated vehicle based on the signal received from each of the other vehicles to provide proper spacing between the remaining vehicles to avoid collisions therebetween and maximize throughput of the vehicles along the pathway.

3. A method for controlling a plurality of vehicles along a pathway, comprising:
    monitoring a speed and a location of each of a plurality of vehicles with respect to a pathway via a monitoring system located within each vehicle;
    transmitting a primary signal that includes the speed and location of each vehicle directly from each vehicle to each of the other vehicles via a transmitter located within each vehicle;
    receiving the primary signal directly from the other vehicles via a receiver located within each vehicle;
    receiving the primary signal at a central controller;
    receiving a secondary signal from the central controller via the receiver located within each vehicle;
    controlling each of the vehicles via a vehicle control system located within each vehicle based on the primary signal received from each of the other vehicles to provide proper spacing between the vehicles to avoid collisions therebetween and maximize throughput of the vehicles along the pathway; and
    controlling each of the vehicles via the vehicle control system located within each vehicle based on the secondary signal received from the central controller if the primary signal is interfered with to provide proper spacing between the vehicles to avoid collisions therebetween and maximize throughput of the vehicles along the pathway.

4. An automated transportation system, comprising:
    a plurality of vehicles adapted to travel along a pathway;
    a monitoring system located within each vehicle and adapted to monitor a speed and a location with respect to the pathway;
    a transmitter located within each vehicle and adapted to transmit a primary signal that includes data on the speed and the location monitored;
    a central controller adapted to receive the primary signal from each vehicle, and adapted to interpret the primary signal received and transmit a secondary signal;
    a receiver located within each vehicle and adapted to receive the primary and secondary signals from each vehicle and the central controller, respectively; and
    a vehicle control system located within each vehicle and adapted to interpret the primary signal received by the receiver from each of the other vehicles and control the associated vehicle to provide proper spacing between the remaining vehicles to avoid collisions therebetween and maximize throughput of the vehicles along the pathway, and further adapted to interpret the secondary signal received by the receiver from the central controller if the primary signal is interfered with to provide proper spacing between the remaining vehicles to avoid collisions therebetween and maximize throughput of the vehicles along the pathway.

5. The method of claim 1, wherein the steps of monitoring, transmitting and receiving includes monitoring, transmitting and receiving the acceleration/deceleration of each vehicle.

6. The method of claim 5, wherein the steps of monitoring, transmitting and receiving includes monitoring, transmitting and receiving the application of brakes within each vehicle.

7. The method of claim 6, further including:
controlling the location of each of the vehicles within the track system, wherein the track system includes at least two track members from which the vehicles can be alternatively supported.

8. The method of claim 7, wherein the steps of monitoring, transmitting and receiving includes monitoring, transmitting and receiving a switching state of each vehicle.

9. The method of claim 8, wherein the transmitting and receiving steps are completed via a wireless communication system.

10. The method of claim 1, wherein the method includes controlling at least four vehicles.

11. The method of claim 1, wherein the steps of monitoring, transmitting and receiving includes monitoring, transmitting and receiving the acceleration/deceleration of each vehicle.

12. The method of claim 1, wherein the steps of monitoring, transmitting and receiving includes monitoring, transmitting and receiving the application of brakes within each vehicle.

13. A method for controlling a plurality of vehicles along a pathway, comprising:
monitoring a location and a speed of each of a plurality of vehicles with respect to a pathway via an on-board monitoring system within each vehicle;
transmitting a signal that includes the location and the speed of each vehicle directly from each vehicle to each of the other vehicles via an on-board transmitter within each vehicle;
receiving the signal directly from the other vehicles via an on-board receiver within each vehicle;
controlling each of the vehicles via an on-board controller within each vehicle based on the signal received from each of the other vehicles to provide proper spacing between the vehicles to avoid collisions therebetween and maximize throughput of the vehicles along the pathway; and
controlling the location of each of the vehicles within a track system, wherein the track system includes at least two track members from which the vehicles can be alternatively supported.

14. The method of claim 13, wherein the steps of monitoring, transmitting and receiving includes monitoring, transmitting and receiving a switching state of each vehicle.

15. The method of claim 1, wherein the transmitting and receiving steps are completed via a wireless communication system.

16. The automated transportation system of claim 2, wherein the monitoring system is further adapted to monitor the distance between the associated vehicle and a vehicle immediately preceding the associated vehicle.

17. The automated transportation system of claim 16, wherein the monitoring system is further adapted to monitor the acceleration/deceleration between the associated vehicle and the vehicle immediately preceding the associated vehicle.

18. The automated transportation system of claim 17, wherein the transmitter and receiver are wireless communication devices.

19. The automated transportation system of claim 18, wherein the pathway includes a track system adapted to support the plurality of vehicles.

20. The automated transportation system of claim 19, wherein the track system includes at least two track member adapted to alternatively support the plurality of vehicles.

21. The automated transportation system of claim 20, wherein each vehicle is adapted to switch between the two track members, and wherein the monitoring system is further adapted to monitor a switching state of the associated vehicle.

22. The automated transportation system of claim 2, wherein the monitoring system is further adapted to monitor the acceleration/deceleration between the associated vehicle and the vehicle immediately preceding the associated vehicle.

23. The automated transportation system of claim 2, wherein the transmitter and receiver are wireless communication devices.

24. The automated transportation system of claim 2, wherein the track system includes at least two track members adapted to alternatively support the plurality of vehicles.

25. The automated transportation system of claim 24, wherein the each vehicle is adapted to switch between the two track members, and wherein the monitoring system is further adapted to monitor a switching state of the associated vehicle.

26. The method of claim 3, further including:
comparing the primary and secondary signals via the vehicle control system located within each vehicle prior to controlling the associated vehicle; and
determining the accuracy of the primary and secondary signals based on the comparison.

27. The method of claim 26, wherein the steps of monitoring, transmitting and receiving include monitoring, transmitting and receiving a location of each vehicle with respect to the pathway.

28. The method of claim 27, wherein the steps of monitoring, transmitting, and receiving include monitoring, transmitting, and receiving an acceleration/deceleration of each vehicle with respect to a vehicle immediately preceding each vehicle.

29. The method of claim 28, wherein the steps of monitoring, transmitting and receiving include monitoring, transmitting and receiving the application of brakes within each of the vehicles.

30. The method of claim 29, further including:
controlling the location of each of the vehicles within a track system, wherein the track system includes at least two track members which can alternatively support the vehicles.

31. The method of claim 30, wherein the steps of monitoring, transmitting and receiving include monitoring, transmitting and receiving a switching state of each vehicle.

32. The method of claim 3, wherein the transmitting and receiving steps are completed via a wireless communication system.

33. The method of claim 3 wherein the steps of monitoring, transmitting and receiving include monitoring, transmitting and receiving the location of each vehicle with respect to the pathway.

34. The method of claim 3, wherein the steps of monitoring, transmitting, and receiving include monitoring, transmitting, and receiving an acceleration/deceleration of each vehicle with respect to a vehicle immediately preceding each vehicle.

35. The method of claim 3, wherein the steps of monitoring, transmitting and receiving include monitoring, transmitting and receiving the application of brakes within each of the vehicles.

36. The method of claim 3, further including:
controlling the location of each of the vehicles within a track system, wherein the track system includes at least two track members which can alternatively support the vehicles.

37. The method of claim 36, wherein the steps of monitoring, transmitting and receiving include monitoring, transmitting and receiving a switching state of each vehicle.

38. The automated transportation system of claim 4, wherein the monitoring system is further adapted to monitor an acceleration/deceleration between the associated vehicle with respect to a vehicle immediately preceding the associated vehicle.

39. The automated transportation system of claim 38, wherein the monitoring system is further adapted to monitor the distance between the associated vehicle and the vehicle immediately preceding the associated vehicle.

40. The automated transportation system of claim 39, wherein the monitoring system is further adapted to monitor the application of brakes within the associated vehicle.

41. The automated transportation system of claim 40, wherein the vehicle control system of each vehicle is adapted to compare the primary and secondary signals and determine the accuracy of the primary and secondary signals.

42. The automated transportation system of claim 41, wherein the transmitter and receiver are wireless communication devices.

43. The automated transportation system of claim 42, wherein the pathway includes a track system adapted to support the plurality of vehicles.

44. The automated transportation system of claim 43, wherein the track system includes at least two track members adapted to alternatively support the plurality of vehicles.

45. The automated transportation system of claim 44, wherein the each vehicle is adapted to switch between the two track members, and wherein the monitoring system is further adapted to monitor a switching state of the associated vehicle.

46. The automated transportation system of claim 4, wherein the vehicle control system of each vehicle is adapted to compare the primary and secondary signals and determine the accuracy of the primary and secondary signals.

47. The automated transportation system of claim 4, wherein the transmitter and receiver are wireless communication devices.

48. The automated transportation system of claim 4, wherein the pathway includes a track system adapted to support the plurality of vehicles.

49. The automated transportation system of claim 48, wherein the track system includes at least two track member adapted to alternatively support the plurality of vehicles.

50. The automated transportation system of claim 49, wherein the each vehicle is adapted to switch between the two track members, and wherein the monitoring system is further adapted to monitor a switching state of the associated vehicle.

51. The automated transportation system of claim 4, wherein the monitoring system is further adapted to monitor the distance between the associated vehicle and a vehicle immediately preceding the associated vehicle.

52. The automated transportation system of claim 4, wherein the monitoring system is further adapted to monitor the application of brakes within the associated vehicle.

* * * * *

UNITED STATES PATENT AND TRADEMARK OFFICE
CERTIFICATE OF CORRECTION

PATENT NO.         : 7,286,934 B2                               Page 1 of 1
APPLICATION NO. : 10/493646
DATED              : October 23, 2007
INVENTOR(S)        : Gaegauf et al.

It is certified that error appears in the above-identified patent and that said Letters Patent is hereby corrected as shown below:

Column 1;
Line 29, "transits" should be --transit--.
Line 36, "principal" should be --principles--.
Line 48, "congestions" should be --congestion--.

Column 4;
Line 39, Delete "for".

Column 5;
Line 9, "principals" should be --principles--.
Line 10, "system" should be --systems--.
Line 17, "include" should be --includes--.
Line 48, "cross-section" should be --cross section--.

Column 7;
Line 36, Delete "or" (2nd occurrence).

Column 14;
Line 2, "member" should be --members--.
Line 22, Delete "the" (1st occurrence).

Column 16;
Line 6, Delete "the" (1st occurrence).
Line 25, Delete "the" (1st occurrence).

Signed and Sealed this

Sixth Day of May, 2008

JON W. DUDAS
*Director of the United States Patent and Trademark Office*